US006016424A

United States Patent [19]

Hicks et al.

[11] Patent Number: 6,016,424

[45] Date of Patent: Jan. 18, 2000

[54] USER NOTIFICATION OF MOBILE STATION ORIGINATED TELESERVICE TRANSACTION DELAY

[75] Inventors: Scott Gordon Hicks, Apex; David James Hoover, Cary, both of N.C.

[73] Assignee: Ericsson Inc., Research Triangle Park, N.C.

[21] Appl. No.: 08/960,440

[22] Filed: Oct. 29, 1997

[51] Int. Cl.[7] .......................... H04M 3/42; H04M 11/10; H04Q 7/20; H04Q 7/00

[52] U.S. Cl. .......................... 455/414; 455/466; 455/412; 455/528

[58] Field of Search .................................... 455/414, 466, 455/412, 421, 434, 515, 528, 422, 432, 517, 507, 510, 38.4, 31.3

[56] References Cited

U.S. PATENT DOCUMENTS

| | | | |
|---|---|---|---|
| 5,153,903 | 10/1992 | Eastmond et al. | 455/458 |
| 5,617,468 | 4/1997 | Nojima et al. | 455/421 |
| 5,794,156 | 8/1998 | Alanara | 455/517 |
| 5,878,351 | 3/1999 | Alanara et al. | 455/466 |
| 5,896,376 | 4/1999 | Alperovich et al. | 455/515 X |
| 5,940,760 | 8/1999 | Uistola | 455/434 |

*Primary Examiner*—Dwayne D. Bost
*Assistant Examiner*—Tracy M. Legree
*Attorney, Agent, or Firm*—Jenkens & Gilchrist, P.C.

[57] ABSTRACT

A method for providing a mobile station user notification of the delay of requested teleservice transaction is disclosed. Upon receipt of a request at a mobile station for origination of a teleservice transaction, the mobile station determines whether the transaction may be immediately carried out or will be delayed. If the transaction is delayed, the time period for this delay is determined. The mobile station user is notified of the delay and time period until completion of the requested teleservice transaction may be achieved.

17 Claims, 5 Drawing Sheets

Initiate Mobile Originated Teleservice Transaction
45
Delay_TMR Running ?
N
Y
50
Notify User
60
Auto Send ?
N
Y
65
Stop
70
Save Transaction
75
Delay_TMR Expire ?
N
Y
80
Send Transaction
55

USER NOTIFICATION OF MOBILE STATION ORIGINATED TELESERVICE TRANSACTION DELAY

BACKGROUND OF THE INVENTION

1. Technical Field of the Invention

The present invention relates to mobile originated teleservice transactions, and more particularly, to a method for notifying a mobile station user of teleservice transaction delays.

2. Description of Related Art

The IS-136 standard defines the air interface between a mobile station and a base station. The IS-136 standard supports mobile station originated teleservice transactions such as mobile originating short message services (MO SMS), enabling a mobile station to originate and transmit SMS messages to a base station. A user of an IS-136 compliant mobile station that initiates a teleservice transaction, such as a mobile originated SMS message, may have the transaction terminated before completion due to a variety of causes.

One of these causes arises from temporary delays imposed by a cellular system to disallow any mobile originated teleservice transactions from a given mobile station for a specified period of time. By delaying transactions, the cellular system may control call traffic levels. The mobile station internally tracks the time remaining on the imposed delay, but in present systems, a user is merely unable to quickly complete a requested teleservice transaction. This can frustrate the user due to the lack of relevant information on the delay. Thus, some manner for providing a user with more information and thus limiting frustrations in the initiation of a teleservice transaction would be greatly beneficial.

SUMMARY OF THE INVENTION

The present invention overcomes the foregoing and other problems with a method for providing a mobile station user with notification of teleservice transaction delays in response to a mobile originated teleservice transaction. Initially, the mobile station receives a request for the generation of a teleservice transaction from a user. In response to this request, a determination is made as to whether a DELAY—TMR parameter within the mobile station is currently running. If so, the requested teleservice transaction may not be completed, and the time period for which the requested teleservice transaction will be delayed is determined. Upon determination of this time period, the user is notified of the delay length using a visual or audio display.

The user may also be queried through the display as to whether the user desires to automatically transmit the teleservice transaction upon completion of the delay period. The user responds to this query through a user interface associated with the mobile station, and the teleservice transaction may then be internally stored within a memory element associated with the mobile unit if necessary. If additional teleservice transactions are generated while a teleservice transaction is already queued within the memory element of the mobile station, the user is notified of the additional request and may alternatively substitute the new teleservice transaction request for the old or may queue the new teleservice transaction behind the old transaction.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
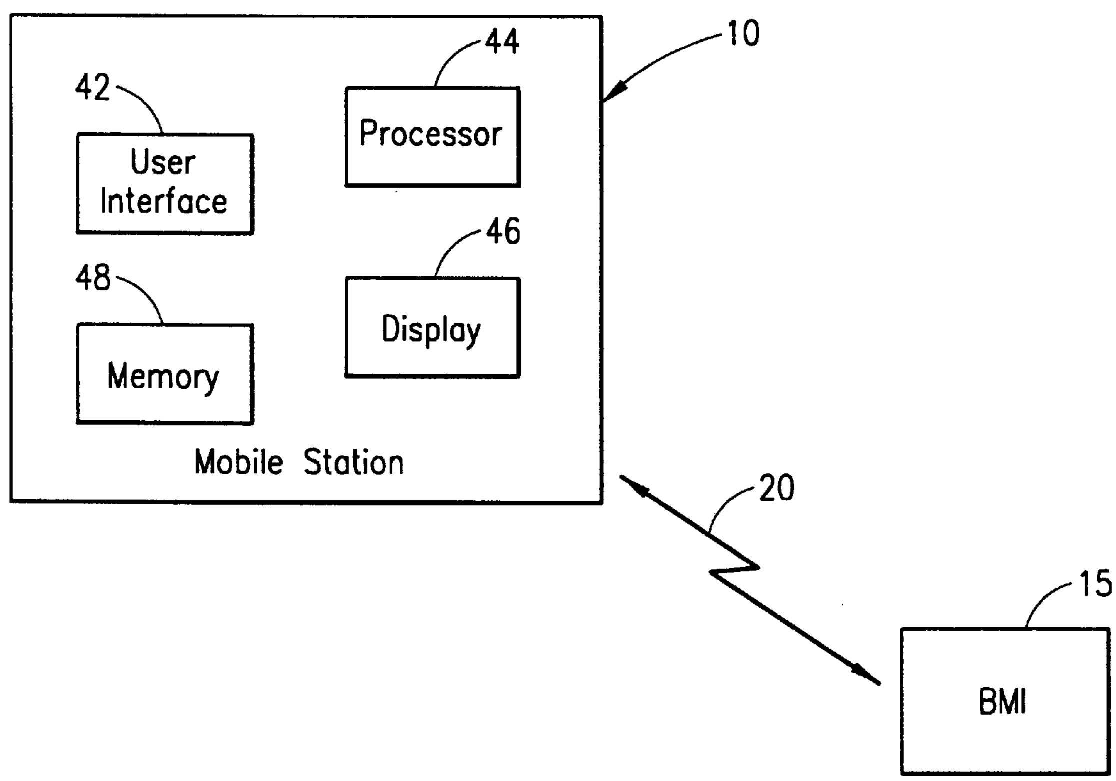
FIG. 1 is a block diagram of a mobile station according to the present invention communicating with a base station/mobile switching center/interworking function (BMI)

Referring now to the Drawings, and more particularly to FIGS. 1, there is illustrated a block diagram of a mobile station 10 communicating with a base station/mobile station/interworking function (BMI) 15. The communications link 20 between the mobile station 10 and BMI 15 is enabled using the IS-136 communications protocol. The IS-136 protocol enables the mobile station 10 to evoke originated point-to-point (OPTP) teleservice (TS) procedures. Teleservice transactions may include a variety of services, for example, the generation of short message service (SMS) messages. While the following descriptions are made with respect to the generation of SMS messages, it should be understood that any type of teleservice transactions may benefit from the notification method of the present invention. Initiation of the OPTP teleservice procedures initiates several checks that must occur before the teleservice transaction may proceed. One of these checks involves determining the condition of the DELAY__TMR parameter 40. If the DELAY__TMR parameter 40 is currently running, the mobile station 10 must remain in a DCCH camping state and not initiate the teleservice transaction until the DELAY__TMR parameter expires.

Figure 2:
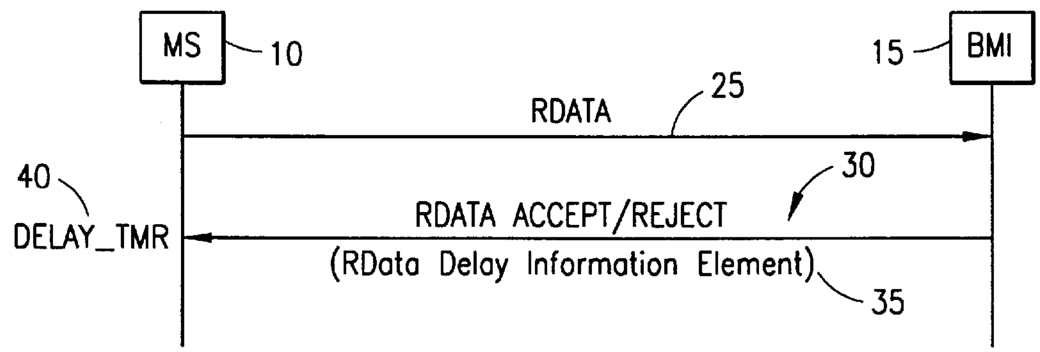
FIG. 2 is a signal diagram illustrating a teleservice transaction between a mobile station (MS) and BMI.

The DELAY__TMR parameter 40 is initiated by the mobile station 10 in response to receipt of an R-DATA delay information element 35 as more fully illustrated in FIG. 2. The mobile station 10 initiates a teleservice transaction such as short message service messages by transmitting an R-DATA (relay data for teleservices) message 25. The BMI 15 responds by transmitting either an R-DATA ACCEPT or R-DATA REJECT message 30. Optionally included with the R-DATA ACCEPT/REJECT message 30 is an R-DATA delay information element 35. If present, the R-DATA delay information element 35 initiates running of the DELAY__TMR parameter 40 at the mobile station 10. The DELAY__TMR parameter 40 indicates the time period until a teleservice transaction may be initiated by the mobile station 10. The BMI 15 utilizes the delay provided by the DELAY__TMR parameter 40 to control the number of mobile originated teleservice transactions initiated during any particular time period.

Figure 3:
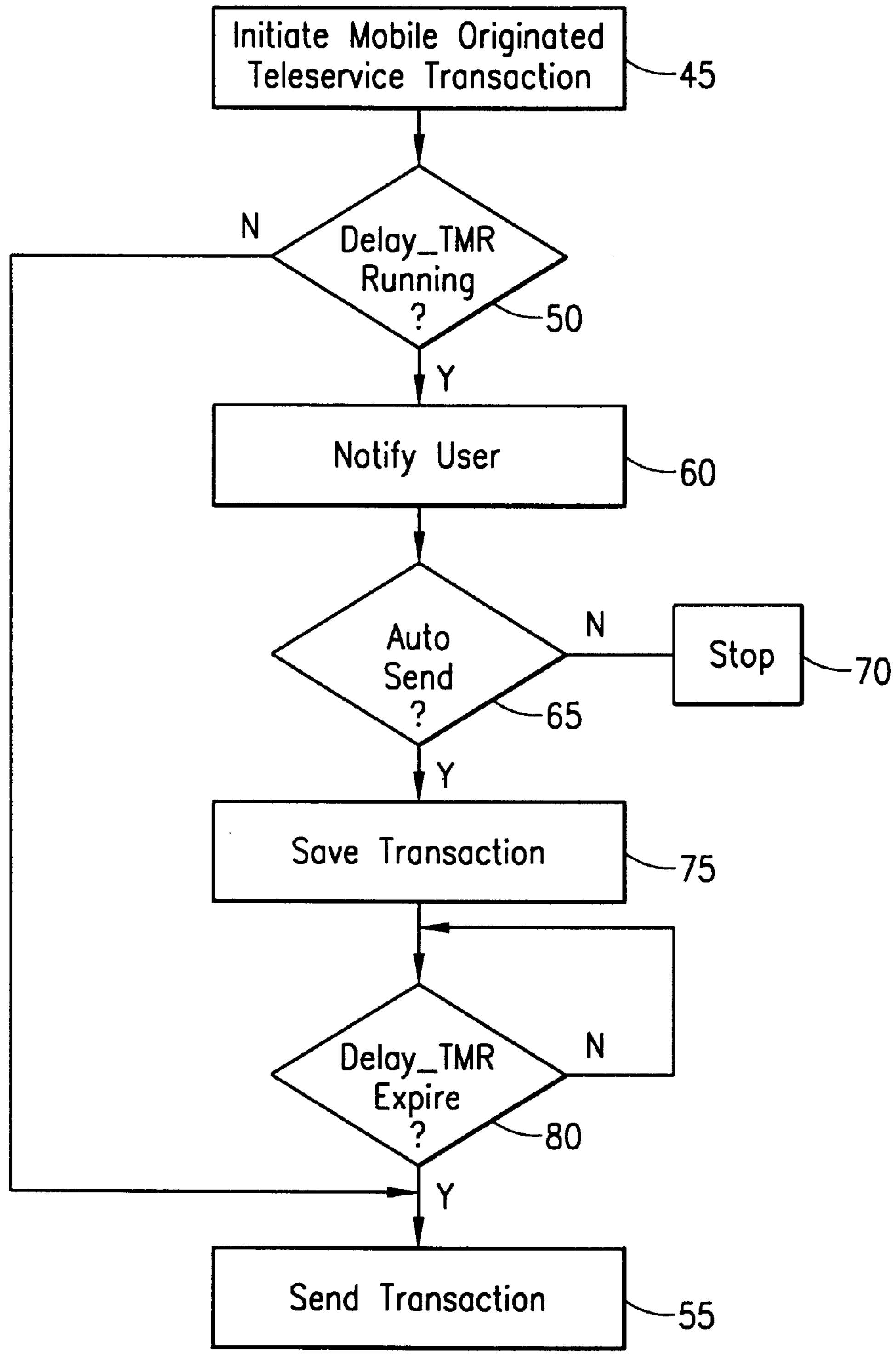
FIG. 3 is a flow diagram of a first embodiment of the present invention for queuing a single teleservice transaction.

Referring now to FIGS. 1 and 3, there is illustrated a first embodiment of the method of the present invention. Initially, at step 45, a mobile originated teleservice transaction is requested by a user of a mobile station 10 through some type of user interface 42. Upon initiation of the transaction, a determination is made by a processor 44 at inquiry step 50 as to whether the DELAY__TMR parameter 40 is currently running. If the DELAY__TMR parameter is not running, the teleservice transaction is completed at step 55. However, if the DELAY_TMR parameter 40 is presently running, the processor 44 instructs the user to be notified at step 60 that the teleservice transaction cannot currently be sent. The user may optionally be provided with information that the transaction may be transmitted in x minutes and y seconds, wherein x and y denote the time remaining before the DELAY_TMR parameter 40 expires.

Notification is preferably provided via a display 46 providing a visual text display of the notification, for example, in the form:

Temporary network delay!

Your message cannot be sent for 3 minutes and 55 seconds.

Send automatically after delay? (yes/no).

While the preferred embodiment envisions the use of a visual display 46 to a user, it is of course possible to use other means for notifying the user, such as, an audio output from a speaker (not shown).

Inquiry step 65 determines whether the user requests an automatic completion of the teleservice transaction after the delay based on the response to the user notification. The response would be entered via the user interface 42. If automatic completion is not desired, the procedure stops at step 70. If the user requests automatic transmission of the transaction after the delay, the transaction is saved at step 75 within a memory element 48 of the mobile station 10. The processor 44 monitors for expiration of the DELAY_TMR parameter 40 at inquiry step 80. Once the DELAY_TMR parameter 40 has expired, the teleservice transaction is completed at step 55.

Figure 4:
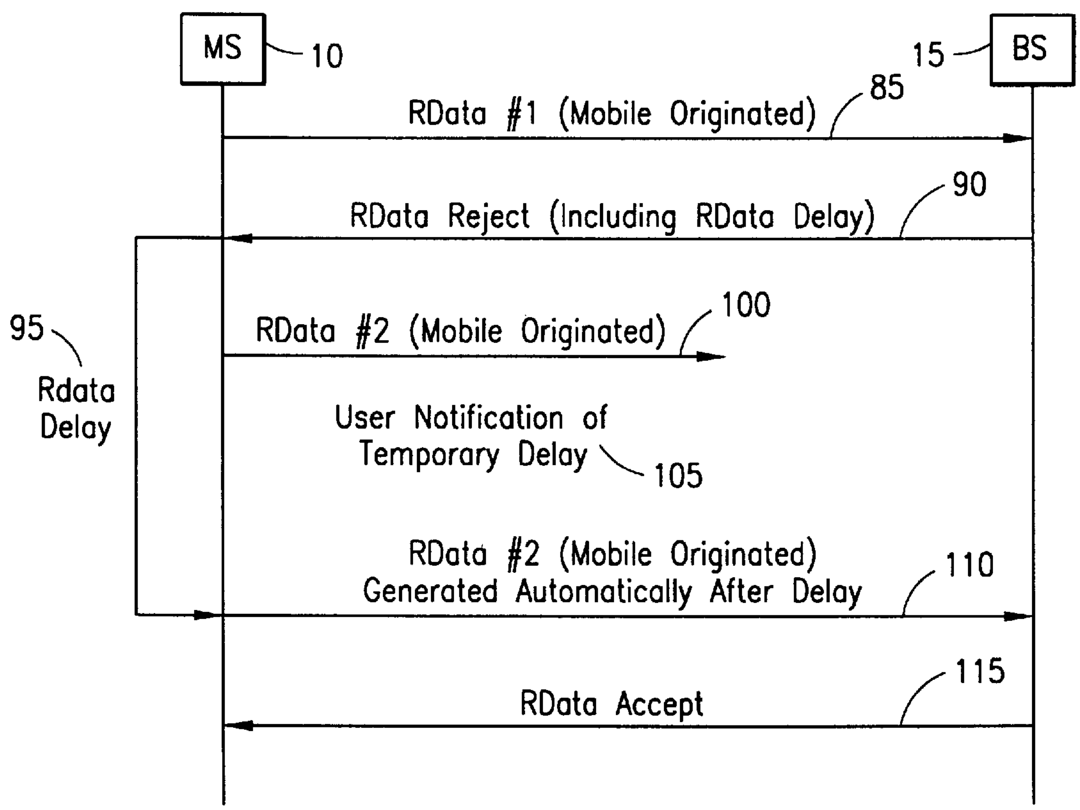
FIG. 4 is a signal diagram for the embodiment of FIG. 3.

Referring now to FIG. 4, there is illustrated a signal flow diagram between a mobile station 10 and base station 15 using the method of the present invention. An initial teleservice transaction is initiated by a first R-DATA mobile originated message 85. The base station 15 transmits an R-DATA REJECT message 90 back to the mobile station 10 including the R-DATA delay information element to temporarily suspend teleservice transactions from the mobile station 10 by initiating the DELAY_TMR parameter 40. The R-DATA delay period 95 is equal to the amount of time shown by the DELAY_TMR parameter 40. If a second mobile originated R-DATA message 100 is initiated during the R-DATA delay period 95, the user is provided a notification of a temporary delay of completion of the teleservice transaction at 105. Once the R-DATA delay 95 is completed, a second mobile originated R-DATA message 110 is automatically generated to the base station 15, which responds with an R-DATA ACCEPT message 115.

Figure 5:
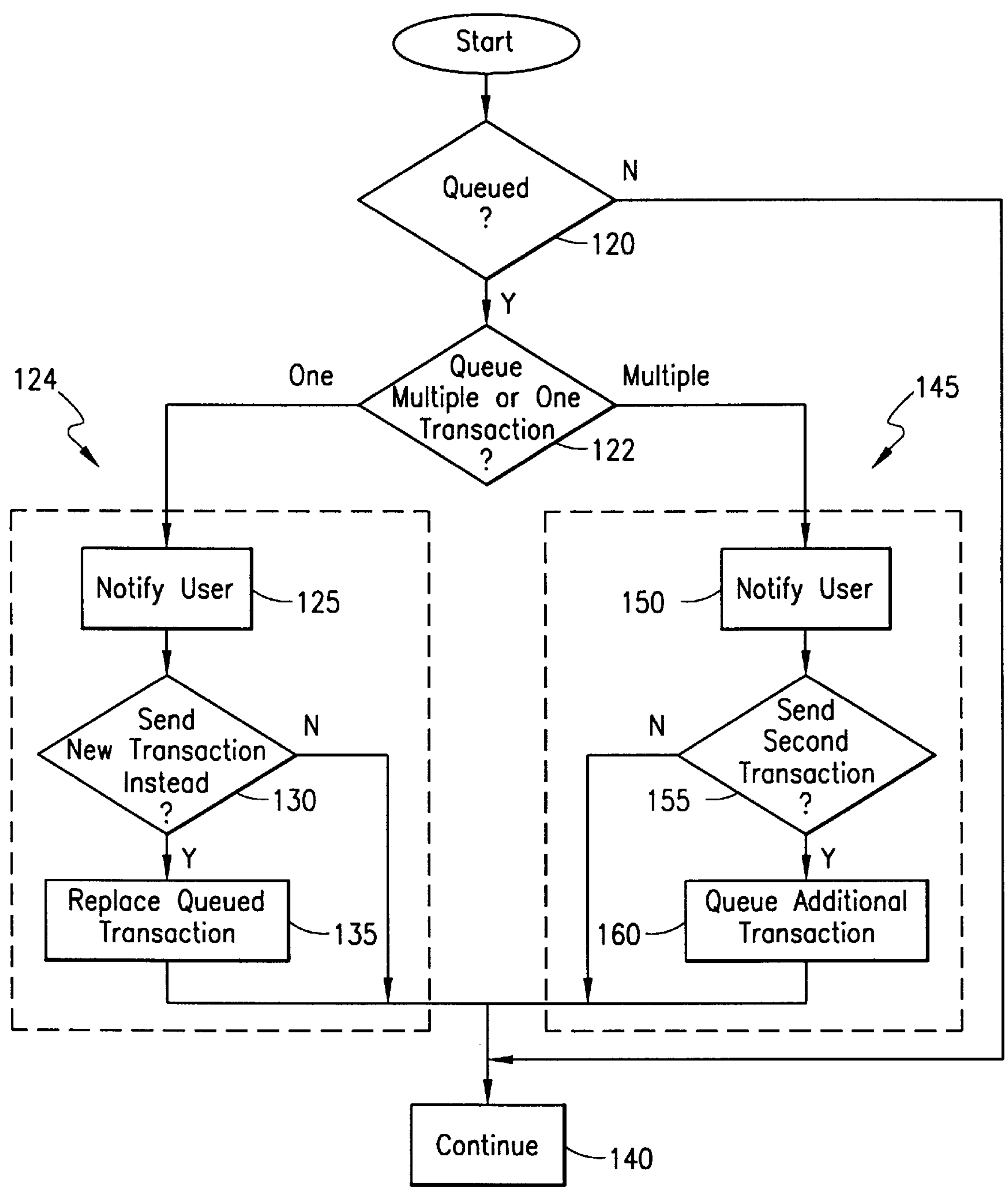
FIG. 5 is a flow diagram illustrating the queuing of multiple teleservice transactions.

Referring now to FIG. 5, there is illustrated an alternative embodiment of the present invention wherein additional teleservice transactions are requested during a time period when a teleservice transaction is already stored within the memory element 48. Inquiry step 120 detects an additional origination of a teleservice transaction from the mobile station 10. At this point, one of two options illustrated generally within boxes 124 and 145 may be followed.

In the option illustrated generally at 124, only one transaction is queued within the memory element 48 of the mobile station 10 at any particular time. Thus, the user is notified at step 125 that a queued message is already present and asked if the user would like to transmit the new teleservice transaction instead of the previously queued one upon completion of the delay. Inquiry step 130 determines the user's response, and if the old teleservice transaction is to be sent, continues processing as previously discussed in FIG. 3 at step 140. Otherwise, at step 135, the new teleservice transaction replaces the queued teleservice transaction within the memory element 48, and this message is transmitted upon expiration of the DELAY_TMR parameter 40.

Alternatively, as shown generally at 145, multiple transactions may be queued within the memory element 48 of the mobile station 10. The user is notified at step 150 that a queued message already exists within the memory element 48, and inquires whether the user would like to send the additional message anyway despite an indeterminate delay. Inquiry step 155 accepts the response and queues the additional message if so requested at step 160. The user is notified that the message will be transmitted as soon as possible via the display 46. Otherwise, the processing continues at step 140 as described previously.

Figure 6:
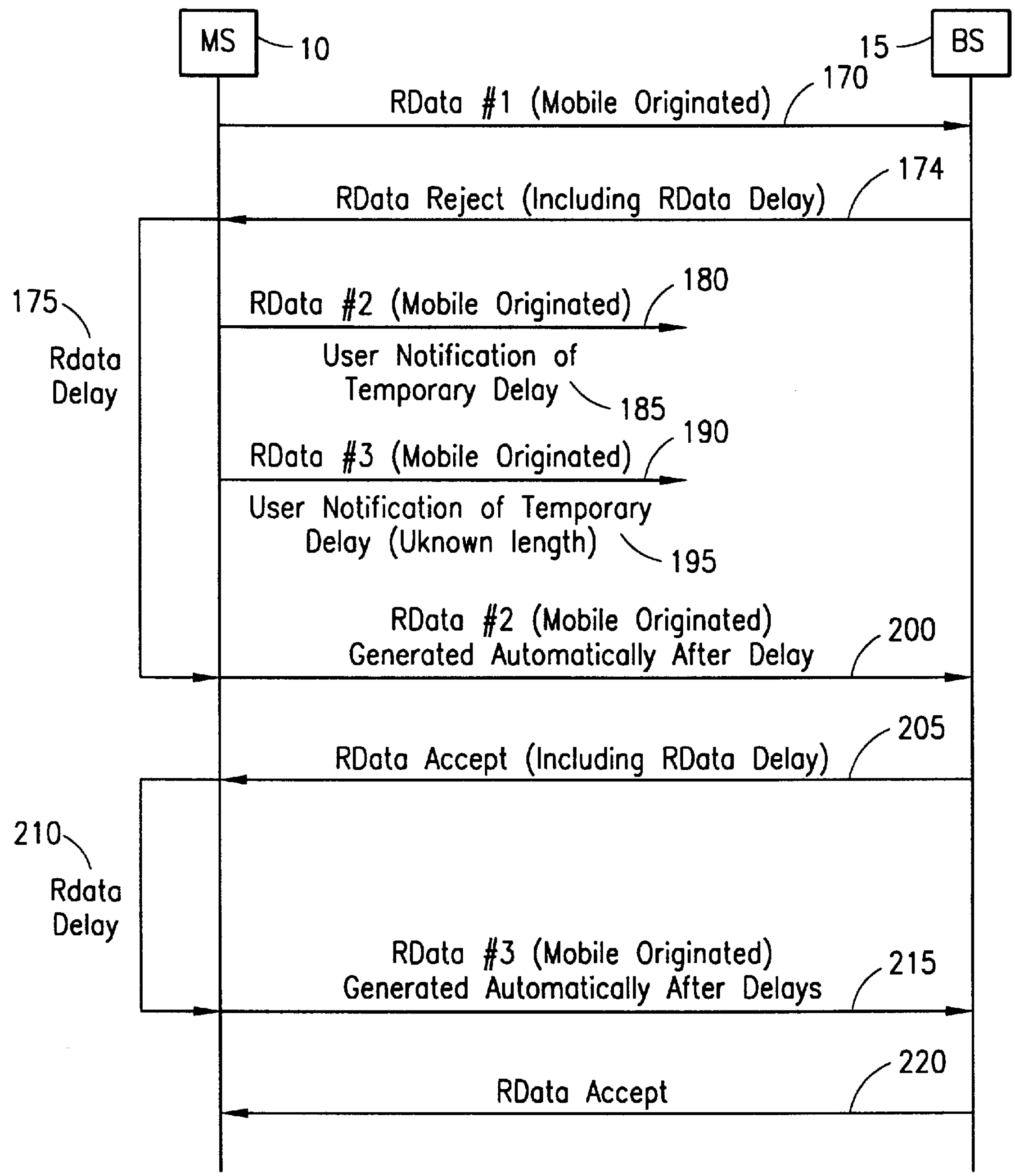
FIG. 6 is a signal diagram for the embodiment of FIG. 5.

Referring now to FIG. 6, there is illustrated a signal diagram describing the message flow between a mobile station 10 and base station 15 when multiple teleservice transactions are queued for transmission. A first teleservice transaction is initiated by a first R-DATA mobile originated message 170 to the base station 15. In response to the R-DATA message 170 the base station 15 transmits an R-DATA REJECT message 174 including an R-DATA delay information element 35 back to the mobile station 10. This initiates the DELAY_TMR parameter 40 and provides an R-DATA delay 175 within the mobile station 10. During the R-DATA delay period 175 a second mobile originated R-DATA message 180 is blocked by t the mobile station 10. This message is stored and the user is notified of the temporary delay in transmitting the message at 185.

A third mobile originated R-DATA message 190 is initiated, and the user is notified of a temporary delay of unknown length at 195. The third message is queued behind the second message. Alternatively, the third message may be substituted for the second message as discussed previously. After expiration of the R-DATA delay 175, the second mobile originated R-DATA message is automatically transmitted at 200. In response to the second R-DATA message the base station transmits an R-DATA ACCEPT message 205 including the R-DATA delay information element 35. This creates an additional R-DATA delay period 210. On expiration of the second R-DATA delay period 210, the third R-DATA message 215 is transmitted to the base station 15 and the base station generates an R-DATA ACCEPT message 220 in response thereto.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. A method for providing a mobile station user notification of a teleservice transaction delay, comprising the steps of:

receiving a request at a mobile station for origination of a teleservice transaction;

determining if initiation of the teleservice transaction will be delayed wherein the step of determining further comprises determining whether a DELAY_TMR parameter is currently running; and notifying the mobile station user of the teleservice transaction delay.

2. The method of claim 1 wherein the step of notifying further comprises the step of notifying the mobile station user of the teleservice transaction delay if the DELAY_TMR parameter is currently running.

3. The method of claim 1 further including the step of determining a time period the teleservice transaction will be delayed.

4. The method of claim 3 further including the step of notifying the mobile station user of the time period the teleservice transaction will be delayed.

5. The method of claim 1 further including the steps of:

querying whether the mobile station user desires to complete the teleservice transaction after completion of the delay;

storing the teleservice transaction in response to an affirmative response to the query; and automatically completing the stored teleservice transaction upon completion of the delay.

6. The method of claim 1 further including the step of determining if a queued teleservice transaction is already stored in response to an affirmative response to the query.

7. The method of claim 6 further including the steps of:

querying whether the mobile station user desires to transmit the teleservice transaction or the queued teleservice transaction; and replacing the queued teleservice transaction with the teleservice transaction in response to the user selecting to transmit the teleservice transaction.

8. The method of claim 6 further including the steps of:

storing the teleservice transaction with the queued teleservice transaction;

notifying the mobile station user of an undetermined time for completion of the teleservice transaction; and completing the teleservice transaction when possible.

9. A method for providing a mobile station user notification of a first teleservice transaction delay, comprising the steps of:

receiving a request at a mobile station for origination of a first teleservice transaction;

determining whether a DELAY_TMR parameter is currently active;

determining a timing delay associated with the teleservice transaction if the DELAY_TMR parameter is currently active; and notifying the mobile station user of the timing delay associated with the teleservice transaction.

10. The method of claim 9 further including the steps of:

querying whether the mobile station user desires to complete the teleservice transaction after completion of the delay;

storing the teleservice transaction in response to an affirmative response to the query; and automatically completing the stored teleservice transaction upon completion of the delay.

11. The method of claim 9 further including the step of determining if a second teleservice transaction is already stored in response affirmative response to the query.

12. The method of claim 11 further including the steps of:

querying whether the mobile station user desires to transmit the first teleservice transaction or the second teleservice transaction; and replacing the first teleservice transaction with the second teleservice transaction in response to the user selecting to transmit the second teleservice transaction.

13. The method of claim 11 further including the steps of:

storing the first teleservice transaction and the second teleservice transaction;

notifying the mobile station user of an undetermined time for completion of the second teleservice transaction; and completing the second teleservice transaction when possible.

14. The method of claim 9 wherein the step of notifying further comprises displaying the timing delay to the mobile station user on a display screen associated with the mobile station.

15. A mobile station responsive to mobile originated teleservice transactions, comprising:

a display for displaying data to a mobile station user;

means for storing at least one queued teleservice transaction;

processing means responsive to origination of a teleservice transaction for determining if execution of the teleservice transaction will be delayed wherein the step of determining further comprises determining whether a DELAY_TMR parameter is currently running and if the teleservice transaction will be delayed, for notifying the user of the delay via the display and for storing the teleservice transaction in the means for storing until completion of the delay.

16. The mobile station of claim 15 wherein the processing means further includes means for querying whether the user wishes to store the teleservice transaction.

17. The mobile station of claim 15 wherein the processing means further determines a time period the teleservice transaction will be delayed and notifies the user of the time period via the display.

* * * * *